United States Patent
Resnitzky et al.

(10) Patent No.: US 9,544,297 B2
(45) Date of Patent: Jan. 10, 2017

(54) METHOD FOR SECURED DATA PROCESSING

(75) Inventors: Uri Resnitzky, Tel Aviv (IL); Nir Naaman

(73) Assignee: Algorithmic Research Ltd., Petach Tikva (IL)

( * ) Notice: Subject to any disclaimer, the term of this patent is extended or adjusted under 35 U.S.C. 154(b) by 911 days.

(21) Appl. No.: 10/374,848

(22) Filed: Feb. 24, 2003
(Under 37 CFR 1.47)

(65) Prior Publication Data

US 2004/0068650 A1 Apr. 8, 2004

Related U.S. Application Data

(60) Provisional application No. 60/362,332, filed on Mar. 8, 2002.

(51) Int. Cl.
*H04L 9/00* (2006.01)
*H04L 29/06* (2006.01)
*H04L 9/32* (2006.01)

(52) U.S. Cl.
CPC ........... *H04L 63/0823* (2013.01); *H04L 9/006* (2013.01); *H04L 9/3268* (2013.01); *H04L 63/0428* (2013.01); *H04L 63/061* (2013.01)

(58) Field of Classification Search
CPC ....................................................... H04L 9/006
USPC ............................ 726/27; 713/155; 380/277
See application file for complete search history.

(56) References Cited

U.S. PATENT DOCUMENTS

| | | | |
|---|---|---|---|
| 5,604,801 A * | 2/1997 | Dolan et al. | |
| 5,937,068 A * | 8/1999 | Audebert | |
| 6,282,709 B1 * | 8/2001 | Reha et al. | |
| 6,338,138 B1 * | 1/2002 | Raduchel et al. | |
| 6,411,715 B1 * | 6/2002 | Liskov et al. | |
| 6,678,821 B1 * | 1/2004 | Waugh et al. | |
| 6,694,025 B1 * | 2/2004 | Epstein et al. | |
| 6,760,752 B1 * | 7/2004 | Liu et al. | |
| 6,853,988 B1 * | 2/2005 | Dickinson | G06F 21/32 380/277 |
| 6,895,502 B1 * | 5/2005 | Fraser | |
| 6,957,199 B1 * | 10/2005 | Fisher | G06Q 20/02 705/50 |
| 7,302,703 B2 * | 11/2007 | Burns | G06F 21/34 713/155 |
| 2001/0056540 A1 * | 12/2001 | Ober | G06F 21/72 713/193 |
| 2002/0099959 A1 * | 7/2002 | Redlich et al. | |
| 2002/0108035 A1 * | 8/2002 | Herley et al. | |

(Continued)

OTHER PUBLICATIONS

Simmons, G.J., "Identification of data, devices, documents and individuals," Security Technology, 1991. Proceedings. 25th Annual 1991 IEEE International Carnahan Conference on Year: 1991 pp. 197-218.*

(Continued)

*Primary Examiner* — Roderick Tolentino
(74) *Attorney, Agent, or Firm* — Reches Patents

(57) ABSTRACT

A method for facilitating secured data processing, the method includes generating, for each client out of at least two clients, a private key, and a public key; and storing at least the private keys at highly secured entity; whereas the highly secured entity is operable to utilize at least a the private key to perform public key infrastructure processing.

13 Claims, 7 Drawing Sheets

(56) References Cited

U.S. PATENT DOCUMENTS

2003/0028766 A1* 2/2003 Gass .................. G06F 21/572
713/164
2003/0033521 A1* 2/2003 Sahlbach

OTHER PUBLICATIONS

Weippl, E. "An approach to role-based access control for digital content," Information Technology: Coding and Computing, 2001. Proceedings. International Conference on Year: 2001 pp. 290-294.*

* cited by examiner

METHOD FOR SECURED DATA PROCESSING

RELATED APPLICATION

The present application hereby claims the priority benefit of U.S. Provisional Application No. 60/362,332, filed Mar. 8, 2002.

FIELD OF THE INVENTION

The invention relates to methods for facilitating secured data processing and especially for Public-Key Infrastructure processing.

BACKGROUND OF THE INVENTION

In computerized systems it is often desired to achieve authentication, secrecy and non-repudiation. Authentication provides a positive identification of an entity in the system. An entity can be a human user, a specific software component or a specific computer. Said entity is commonly defined in the art as a client or client component. Secrecy guarantees that data being stored or transmitted cannot be read by unauthorized entities. Non-repudiation guarantees that an entity cannot disown a previously issued message (also called a transaction).

These goals can be achieved using PKI (Public Key Infrastructure) technology. In PKI systems each entity is assigned a key-pair consisting of a private key and a corresponding public key. The keys are usually multi-digit numbers represented in an appropriate digital form. The keys satisfy certain mathematical properties according to the specific public-key algorithm used.

Some prior art public key algorithms are known as RSA, DH and DSA. RSA was introduced by Rivest, Shamir and Adleman and is disclosed in U.S. Pat. No. 4,405,829 which is incorporated herein by reference. DH was introduced by Diffie, Hellman and Merkle and is disclosed in U.S. Pat. No. 4,200,770 which is incorporated herein by reference. DSA (Digital Signature Algorithm) was introduced by the National Institute for Standards and Technology (NIST) and is defined at Federal Information Processing Standard (FIPS) 186-2, which is also incorporated herein by reference.

It is computationally easy to calculate the public key from a given private key, but it is extremely hard to calculate the private key given a public key.

Some public-key algorithms provide a method for calculating a digital signature of a message using an entity's private key.

A digital signature is data that is a unique binding of the message and the signer's private key. The digital signature can be verified using the original message and the signer's public key, and thus proves the authenticity of the message and provides non-repudiation.

Some public-key algorithms provide a method for encrypting a message using an entity's public key. An encrypted message can only be decrypted using that entity's corresponding private key and thus providing secrecy.

In order to verify a digital signature, authenticate a transaction, or encrypt a message, entities in a PKI based system need access to other entities' public keys. This is usually achieved by means of a public-key database (commonly referred to as the directory).

Certificates are used to bind an entity's identity to their public keys. This binding is needed in order to allow storage and distribution of public keys without the risk that public keys will be replaced by rouge elements.

A certificate is a message that contains the identity of an entity (using its name, address, department etc.), the entity's public key, validity period and a digital signature of these items. This digital signature is calculated by a CA (Certificate Authority) using the CA's private key. The CA's public key is published in the directory or otherwise accessible to the entities that use the CA services.

A CA also publishes a CRL (Certificate Revocation List) periodically. The CRL is a message signed by the CA containing references to every certificate issued by the CA which has been revoked. Revocation can occur when the security of the private key of the entity for which the certificate was issued is reported to be compromised. By checking the CRL, entities can make sure that certificates are indeed valid.

In order to verify the authenticity of certificates and CRLs, an entity needs access to the CA's public key. This is usually provided as a self-signed CA certificate, which is assumed to be locally available to all entities in the system.

In existing PKI based systems, each entity will go through an enrollment process before it can enjoy the benefits of the system. The enrollment process usually includes generating a key pair, generating and sending the CA a certificate request and receiving the entity's certificate from the CA.

In the normal day-to-day operation of PKI based systems, entities access a directory, retrieve other entities' certificates, verify them against the latest CRL, and then use the public key contained in the certificate to encrypt a message or to verify a digital signature. Entities use their private keys to sign messages and to decrypt encrypted data.

Periodically, an entity will need to re-enroll either because a new private key needs to be generated (due to the loss and revocation of the previous key), or because its certificate has expired.

As mentioned earlier, each entity must have means for generating and storing the key-pair as well as the certificate. This medium is referred to as a private-key token.

Tokens are available in existing systems in one of two forms: a software implementation or a hardware implementation. A software implementation stores the private key and certificate on a general purpose computer system in a conventional non-volatile storage medium (such as a hard disk), and performs all the calculations that use the private key using the general purpose computer system CPU.

This kind of implementation usually stores the private key encrypted using a conventional symmetric encryption algorithm (such as DES) with the key derived out of a password or pass-phrase. Knowledge of the password allows access and usage of the stored private key.

Hardware implementation store the private key and certificate on a separate dedicated platform that contains non-volatile storage and a CPU, which is used to perform all the calculations that use the private key. The most common form of hardware implementations is a smartcard (as defined by ISO 7816). A smartcard will typically authenticate the entity wishing to use the stored private key using a password.

Some prior art PKI systems suffer from various disadvantages that slowed down the assimilation of PKI technology and prevented widespread deployment of PKI technology.

Software implementations are vulnerable to password guessing attacks (also known as dictionary attacks). Since the encrypted stored private key can be copied by rouge software running on the general purpose platform, and then the user's password can be searched for, and the key decrypted.

Software implementations are vulnerable to private-key theft. Rouge software running on the general purpose platform can be designed to copy the private key as its being used by the CPU during a signature or a decryption calculation.

Software implementations usually severely limit the mobility of the user. Since most software implementations store the private key and certificate in a special file or in the system's registry, a complex export-import procedure is required in order to allow copying of the private key from one machine to the other.

Software implementations may force the user to re-enroll following a system failure (such as a hard-disk crash), which limits their utility.

Software implementations may require a complex cleansing of the system when a machine is to be reused or serviced by another person in order not to expose the previous user's private key.

Since software and hardware implementations set and use the private key protection password locally, it is usually impossible to 'unlock' a private key once a password is forgotten or lost.

When a private key needs to be administratively revoked (for example when employment of the key-holder is terminated), the cooperation of the key-holder is needed in order to ensure that no use of the key is made until the next release of a CRL. Such cooperation may not be forthcoming.

Hardware implementations incur a high per-seat cost.

Hardware implementations need creation of a logistical support system for replacing stolen, lost or damaged tokens as well as for the initial distribution.

Management of potentially very large number of distributed tokens is problematic especially for removable devices. This relates to system wide updates, such as token format version changes, re-issuing of CA and user certificates, etc.

Since usage of the PKI system is usually mandated by the organizational security policy and does not provide immediate functional benefit to users, active user involvement (mainly during enrollment and re-enrollment) must be minimized if the system deployment is to succeed.

When tokens are distributed across multiple platforms, it is impossible to create a centralized audit log of all the sensitive operations (such as digital signatures) performed using those tokens.

The use of a separate password for accessing the user's private key adds to the burden of passwords to be remembered and periodically changed by the user. This might lead to poor (easily guessed) choice of passwords.

Most commercial PKI systems require administrators to maintain a separate user database for certificate issuing/enrolment purposes. This duplication translates to higher costs and the possibility of loss of synchronization between the PKI user database and the organizational user database.

Roaming servers attempt to address the user mobility issue by storing a software token on a centralized server and providing a method for downloading it to the required computer being used. This solution does not address the basic security problem of software tokens caused by local use of the private key in the clear by a potentially un-trusted platform and do not allow for centralized management of the tokens.

U.S. patent application 2002/0144109 of Benantar et al. describes a system and method that involves sending a client by email and requesting information and generating a pair of keys by a client browser type application.

SUMMARY OF THE INVENTION

The invention provides a method for public key infrastructure processing, the method includes the steps of: generating, for each client out of at least two clients, a private key, and a public key; and storing at least the private keys at highly secured entity; whereas the highly secured entity is operable to utilize at least a the private key to perform public key infrastructure processing.

The method may include determining that a client needs a set of keys, said determination may involve determining that a client has enrolled. The methods may also include retrieving client related information, and utilizing said information for various purposes such as initiating a private key generation, encrypting the private key, performing user authentication.

According to some aspects of the invention user authentication is required prior to performing PKI processing. The user authentication may be either done by an entity other than the highly secured entity, such as a client management entity. The user authentication may also be responsive to information provided by such an entity. According to other aspects of the invention the user authentication may be done by the highly secured entity. It is noted that many organizations have existing authentication means and the system and method for secured data processing may relay on the said authentication means.

According to aspects of the invention user authentication may be implemented by various schemes, including biometric authentication, OTP authentication, and the like.

According to some aspects of the invention the highly secured entity may be further utilized for storing client attribute certificates and related attributes at the highly secured entity. These attributes enable access to various entities. Attribute certificates bind the client with the related attributes.

According to an aspect of the invention whenever PKI processing is required the client may determine whether to access the highly secured entity. Accordingly, the client may send data to be processed by the highly secured entity and receive processed data, without retrieving the private key from the highly secured entity. In various scenarios the client may be able to choose between initiating a highly secured entity based PKI process or utilize other means, such as a local smartcard based PKI processing and the like.

The client may access the highly secured entity by establishing a secured session, but this is not necessarily so. For example, when the PKI processing includes assigning a digital signature the session needs not to be secured. Nevertheless, in such a case it may be useful to implement client integrity schemes.

According to an aspect of the invention the private key is not accessible to entities outside the highly secures entity or to entities that are characterized by a lower security level than the highly secured entity. It is noted that security level of an entity may be determined in response to the security level of the links between said entity and the highly secured entity. Accordingly, the private keys cannot be retrieved by guessing attacks or by private key theft attempts directed towards the client.

As the private key is not stored in the client, the client may initiate public key infrastructure processing from various platforms, as long as his identity may be authenticated. Accordingly, the system and method allow client mobility.

According to another aspect of the invention the PKI processing is facilitated without additional client participation, thus increasing the utility, ease of use, user acceptance and ultimately the smooth deployment of the system. Furthermore, the client is not required to remember and use a separate password or token to access his or her keys thus the administrative overhead (help-desk, etc.) is reduced and the administrator does not need to maintain a separate user and credentials database.

According to another aspects of the invention the highly secured entity either includes a CA or is able to access a CA over a secured media. This facilitates dynamic update of client's private key and public key validity.

According to various aspects of the invention the system and method reduce the cost of PKI processing. For example, the system and method exhibit lower per-seat cost in relation to hardware private key token solutions. As tokens are not distributed between clients, they cannot be lost or damaged by the client, thus reducing the maintenance cost of tokens.

The storage of private keys at the highly secured entity facilitates easy handling of system wide updates, such as token format version changes, re-issuing of CA and user certificates, etc.

According to another aspect of the invention the method further include a step of generating a central audit log of all key generation and usage, thus enabling easy tracking and control over key usage.

BREIF DESCRIPTION OF THE DRAWINGS

Further features and advantages of the invention will be apparent from the description below. The invention is herein described, by way of example only, with reference to the accompanying drawings, wherein.

DETAILED DESCRIPTION

Figure 4:
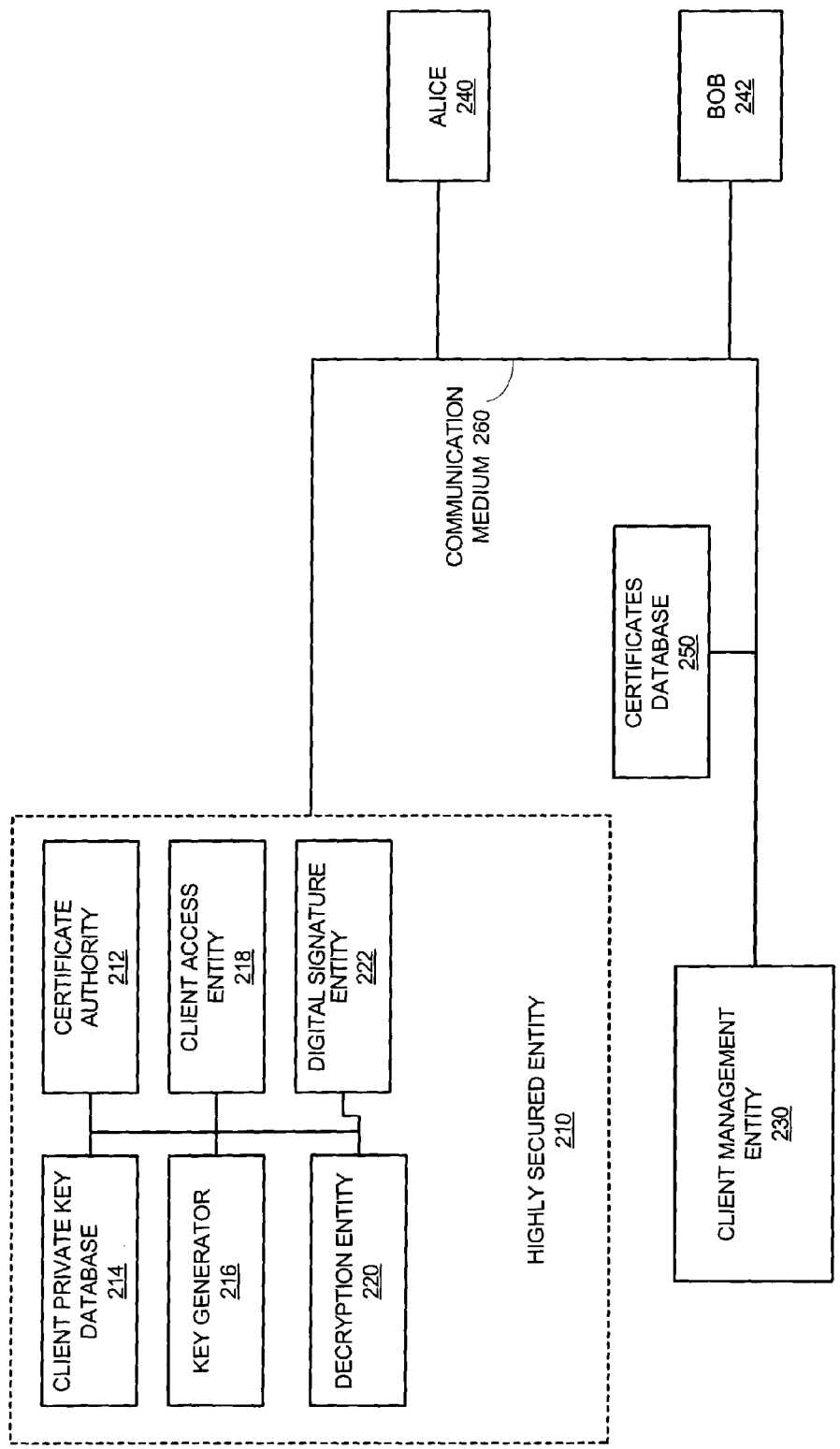
FIG. 4 illustrates a system for secured data processing, in accordance to an embodiment of the invention.

Referring to FIG. 4 illustrating an overview of a system 200 for secured data processing and the environment of system 200. System 200 includes highly secured entity 210 that is connected, via communication medium 260 to client management entity 230, certificate database 250 and multiple clients, such as Alice 240 and Bob 242. System 200 may include additional entities such as communication medium access controller and highly secured entity management unit, but these are not shown for simplicity of explanation.

Highly secured entity 210 may include at least some of the following entities: certificate authority (CA) 212, client private key database 214, client access entity 218, key generator 216, decryption entity 220 and digital signature entity 222. Highly secured entity 210 may implement various well-known schemes for providing a high security level. The well-known schemes may include utilizing various hardware and/or software entities, some of which are discussed in accordance with FIG. 4.

Those of skill in the art will appreciate that communication medium 260 may include various networks and/or links, switched and/or servers, and may support various communication protocols. These networks may include wireless networks, cable based networks, satellite based networks, LANs, WANs, Internet, intra-net infrastructures and the like. It is further noticed that multiple clients may be connected to system 200. According to an aspect of the invention the clients may belong to a single organization and/or are managed by the same client management entity, but this is not necessarily so.

It is noted that the highly secured entity may include many components, some of which may be connected to each other by various networks/links. According to one aspect of the invention, that is further illustrated at FIG. 1 the highly secured entity includes a server. It is further noted that the highly secured entity may also function as a client management entity, but this is not necessarily so and in many cases the highly secured entity will be installed in environments that already include a client management entity.

Figure 5:
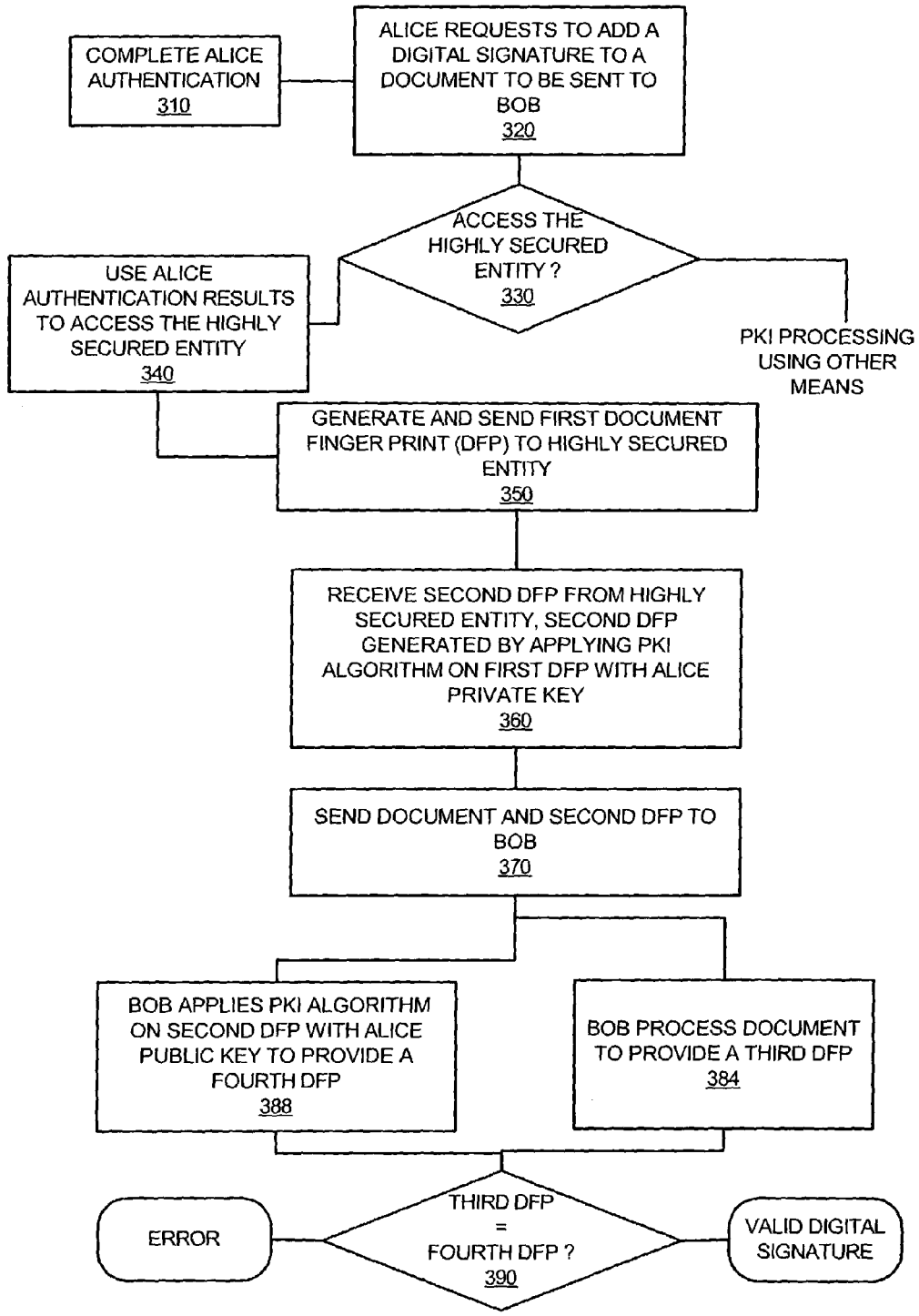
FIG. 5 illustrates a method for providing a digital signature, in accordance to an embodiment of the invention.

Referring to FIG. 5 illustrating a method 300 for providing a digital signature for a client named Alice, in accordance with an embodiment of the invention.

As illustrated by step 320, it is assumed that Alice requests to add a digital signature to a certain document and then to send the signed document to Bob.

Figure 7A:
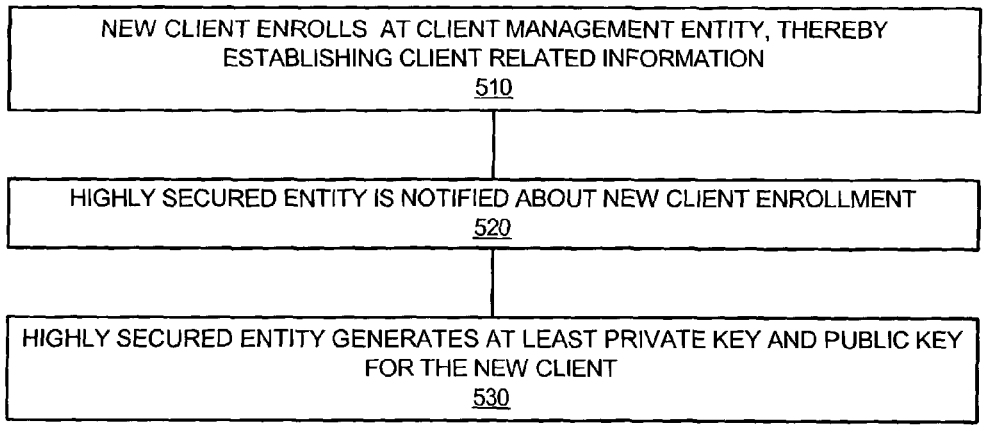
FIGS. 7A-7B illustrate a client enrollment session and a client cancellation session, in accordance to an embodiment of the invention.

Step 320 may be preceded by the following steps:

Enrolling Alice (such as step 510 of FIG. 7A). This is usually managed by an entity other than the highly secured entity, for example client management entity 230 of FIG. 4.

Detecting said enrollment and the generation of a private key and public key for Alice (such as steps 520 and 530 of FIG. 7A), Generating a certificate for Alice, whereas both the certificate and the public key are made accessible to other clients (they can be stored in a certificate database 250 of FIG. 4).

Completing Alice authentication (step 310).

Step 320 is followed by optional query step 330 of determining whether to access the highly secured entity. Query step 330 may be required if Alice has other means for generating a digital signature. These other means may include any of the prior art means. If the other means are selected then method 300 continues to perform PKI processing using these other means.

If the highly secured entity is selected query step 330 is followed by step 340 of using Alice authentication results to allow (or deny, if the authentication session failed) her to access the highly secured entity. Said authentication may be implemented by client access entity 218 of FIG. 4.

Step 340 is followed by step 350 of generating (by Alice) and sending a first document fingerprint (DFP) to the highly secured entity. The first DFP may be generated by various prior art methods.

The highly secured entity receives the first DFP and provides a second DFP by applying a PKI algorithm on the first DFP, using Alice's private key. The second DFP is actually an encrypted version of the first DPF.

The second DFP is received by Alice that in turn sends the second DFP and the document to Bob, via communication link 260, during step 370.

Bob then process the document to generate a third DFP (step 384) and also applies a PKI algorithm on the second DFP with the public key of Alice, to provide a fourth DFP (step 388). After these steps are completed Bob compares the third DFP and the fourth DFP and if they are equal, Bob verifies that the received digital signature was the digital signature of Alice.

Those of skill in the art will appreciate that method 500 may also include various steps, some of which were omitted for simplicity of explanation. These steps may include an establishment of a secured session between Alice and the highly secured entity, an establishment of a secured session between Bob and Alice, applying a PKI algorithm on Alice certificate with the CA public key to verify the authenticity of Alice certificate, and the like.

Figure 6:
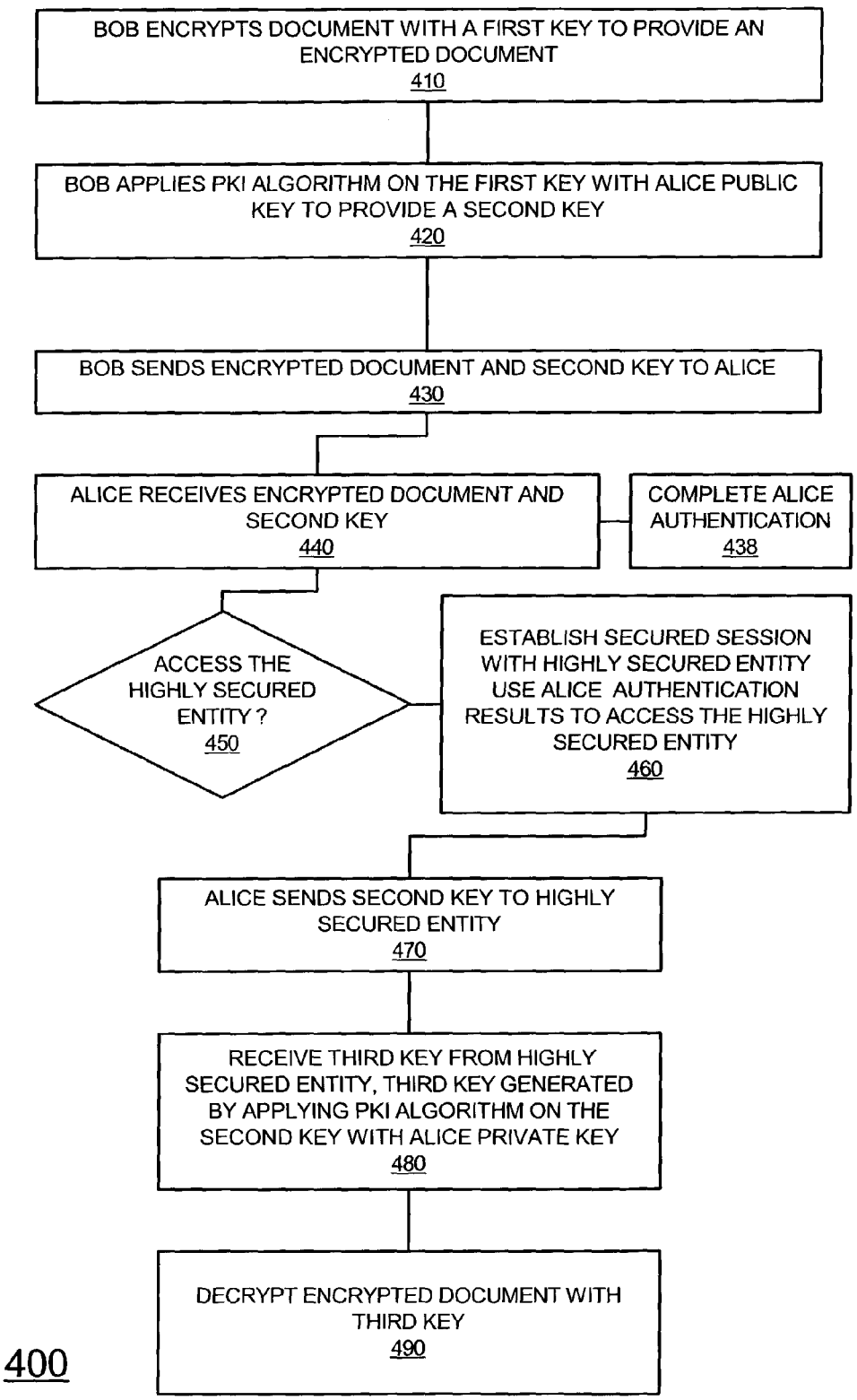
FIG. 6 illustrates a method for encrypting and decrypting a document, in accordance to an embodiment of the invention.

Referring to FIG. 6 illustrating a method 400 for encrypting and decrypting a document.

As illustrated by steps 410-430, it is assumed that Bob requests to encrypt a document and to send the encrypted document (also known as ciphertext) to Alice. Step 320 is preceded by the steps of: (i) Alice enrollment (may be managed by client management entity 230), (ii) detection of said enrollment and the generation of a private key and a public key for Alice, (iii) the provision of a certificate for Alice and (iv) a completion of Alice authentication session.

As illustrated at step 410, Bob starts by encrypting a document with a first key to provide an encrypted document (ciphertext). Bob may implement various well-known methods for the selection/generation of said first key.

Step 410 is followed by step 420 of Bob applying PKI algorithm on the first key with Alice's public Key (retrieved from certificate database 250) to provide a second key.

Step 420 is followed by step 430 of sending the encrypted document and the second key to Alice.

Alice receives the encrypted document and second key at step 440. Step 440 is followed by query step 450 of determining whether to access the highly secured entity. Assuming that the answer is positive step 450 is followed by step 460 of establishing a secured session with the highly secured entity using Alice's authentication session results to enable Alice to access the highly secured entity. It is noted that the secured session may be established prior to the reception of the encrypted document, such as during an initialization step.

Step 460 is followed by step 470 of sending the second key from Alice to the highly secured entity.

The highly secured entity receives the second key and applies a PKI algorithm on the second key, using Alice's private key, to provide a third key. The third key is then sent to Alice.

Alice then receives the third key from the highly secured entity (step 480) and decrypts the encrypted document with the third key, during step 490.

It is noted that the highly secured entity may be capable of handling multiple PKI processing requests simultaneously, and may include management, queuing and routing capabilities. For simplicity of explanation these capabilities are not graphically illustrated.

Figure 7B:
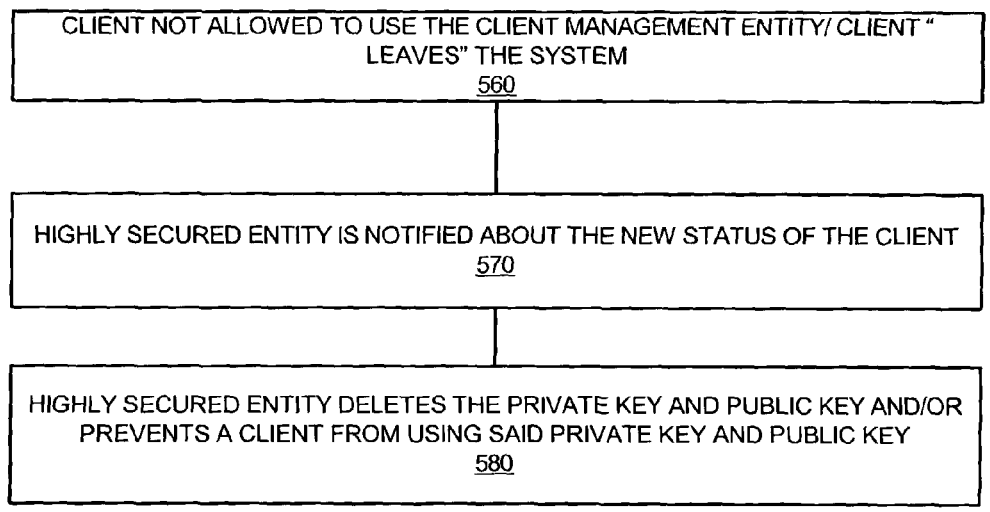

Referring to FIGS. 7A-7B illustrating a client enrollment session and a client cancellation session.

The enrollment session of FIG. 7A starts by step 510 of client enrollment. The enrollment may be managed by other entities than the highly secured entity, but this is not necessarily so. In a typical non-limiting scenario the highly secured entity is utilized in an environment that has other entities for managing clients and performing client authentication. Referring to FIG. 4, the enrollment step may be managed by client management entity 230. During step 310 client related information may be either generated and/or stored in client management entity 230. This information may include an authentication credential (such as a password) that may allow the client to access the highly secured entity.

Step 510 is followed by step 520 of notifying the highly secured entity about said enrollment. Either one of the highly secured entity or the client management entity or even another entity (such as but not limited a controller) may initiate step 520. Said notification may be done in various manners, including a periodic manner, a synchronous or an asynchronous manner. This step may be initiated in response to a single or multiple enrollments or a combination of said manners. According to an aspect of the invention the highly secured entity is provided with the client authentication credential, to enable said client to access the highly secured entity.

Step 520 is followed by step 530 of generating at least a private key and a public key for the new client. The highly secured entity may include a CA that also generates a certificate. If the highly secured entity is connected to a CA it may generate and send a certificate request to the CA. The CA may serve the highly secured entity but may also serve other entities. The CA may send the certificate to a certificate database and notify the highly secured entity, send the certificate to the highly secured entity that in turn sends the certificate to the certificate database or even not do any of said operations.

The cancellation session of FIG. 7B starts by step 560 of determining that the client may not use the system. Said determination may be reached when the client "leaves" the organization, or when the client is barred (even temporarily) from using the system.

Step 560 is followed by step 570 of notifying the highly secured entity that the client is not allowed to access it. Usually step 560 is immediately followed by step 570, to prevent an un-authorized client from using the system.

Step 570 is followed by step 580 of preventing the client from using the system. Step 580 may be implemented by the highly secured entity. The highly secured entity may erase the private key of said client, may prevent usage of said client private key. It is noted that the CA may also be involved by updating its CRL, whereas said update may be initiated by the highly secured entity or even by the client management entity 230.

Figure 1:
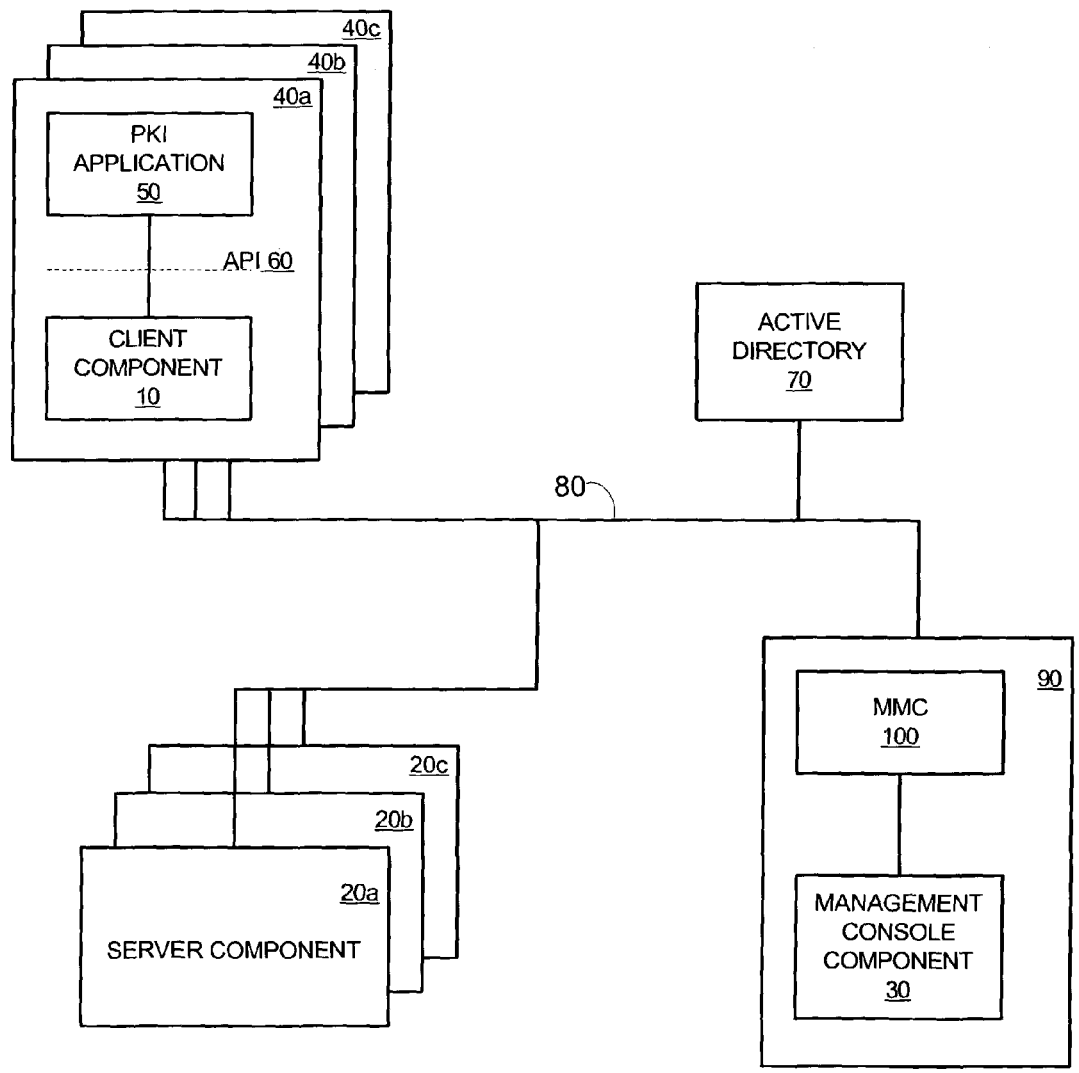
FIG. 1 illustrates a client component, a server component and a management console component, in accordance to an embodiment of the invention.
Figure 2:
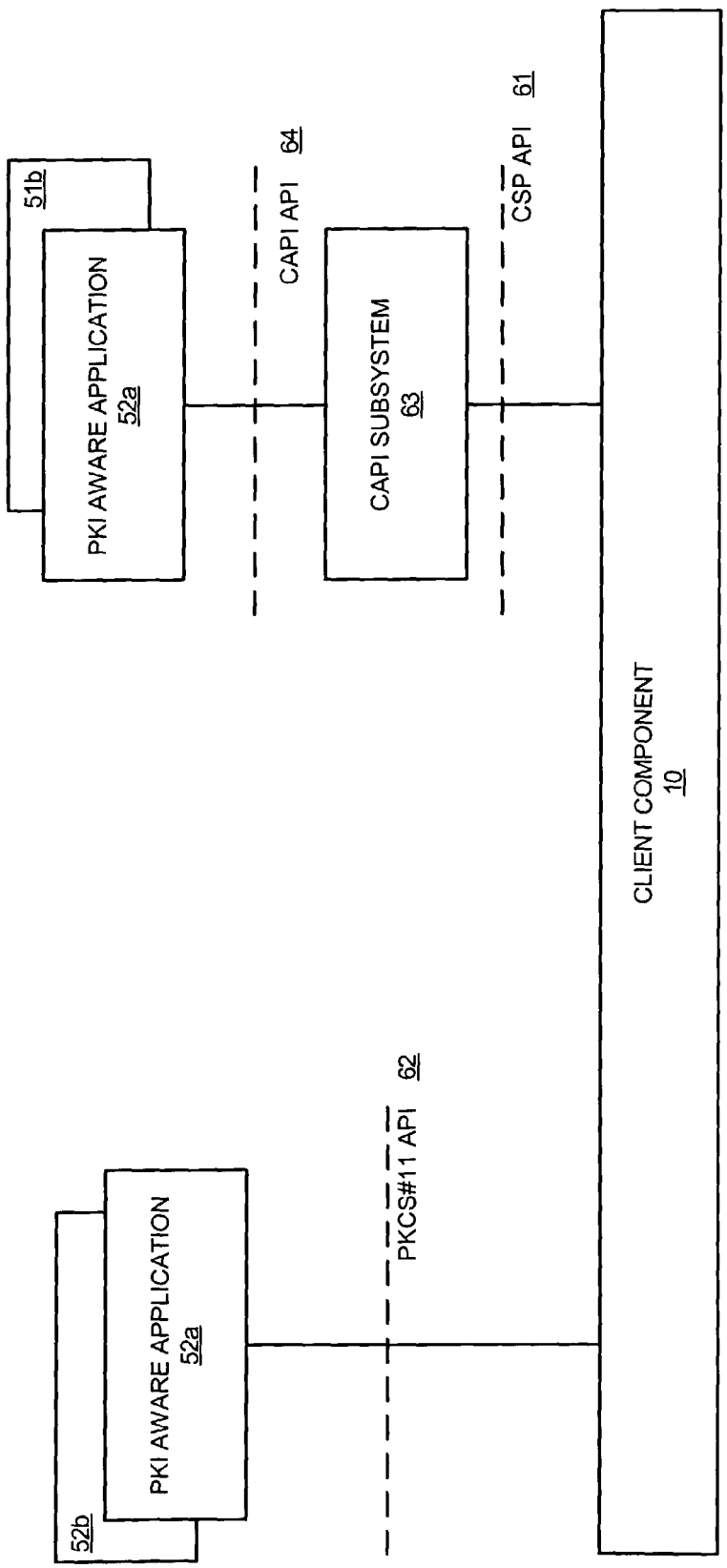
FIG. 2 illustrates in greater details the client component of FIG. 1, in accordance to an embodiment of the invention.
Figure 3:
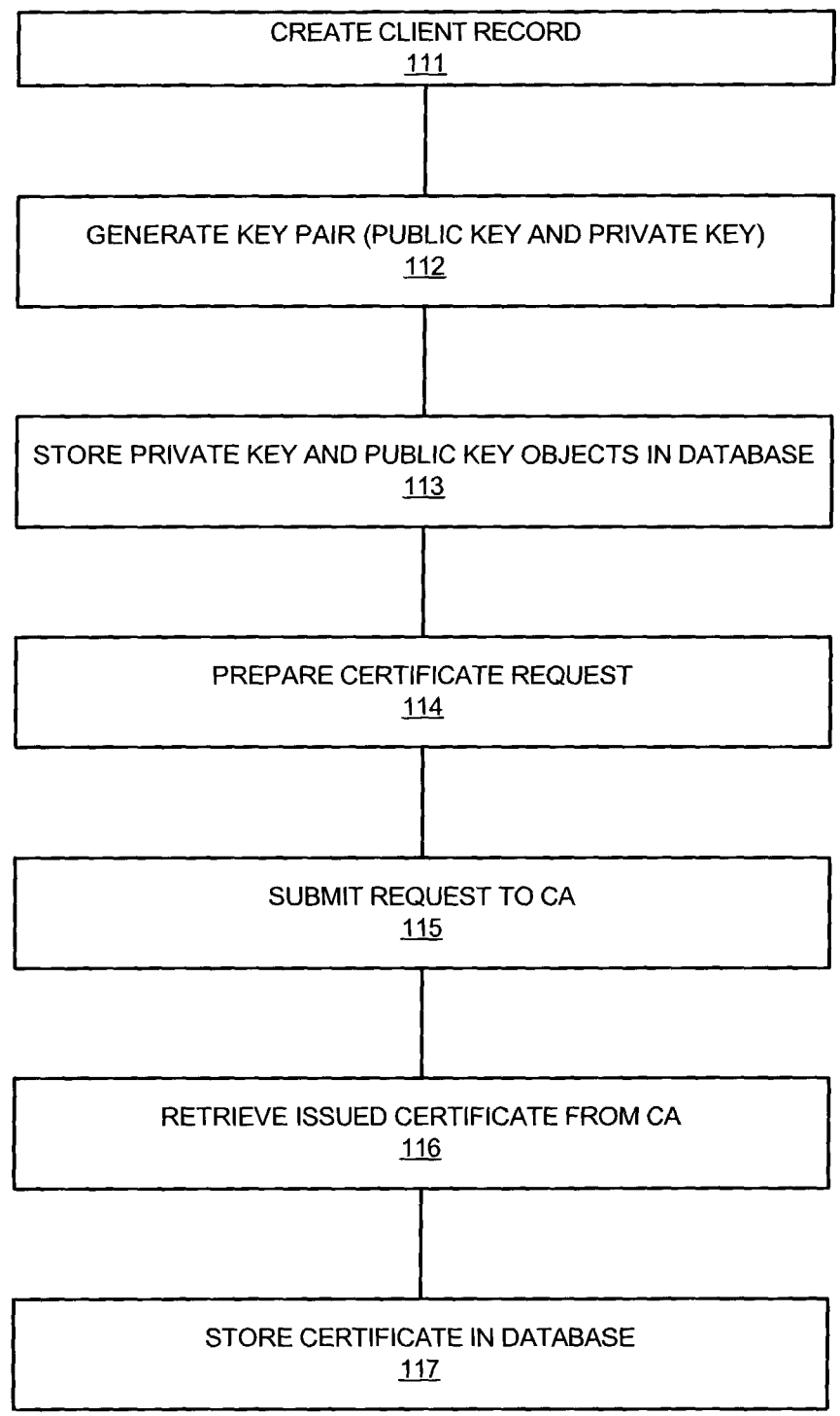
FIG. 3 illustrates an enrollment session also referred to as "user creation event", in accordance to an embodiment of the invention.

Referring now to FIGS. 1-3 that describe in greater details various non-limiting embodiments of the invention. The system of FIGS. 1-2 includes a highly secured entity such as server components 20 or 20a-20c, multiple clients such as client components 40, 40a-40c, a certificate database such as Microsoft Active Directory 70, a communication medium such as organization network 80. It is noted that the client management entity may be partially implemented by Microsoft Active Directory 70, whereas said directory may only be utilized for storing data being generated by another client management entity.

Referring to FIG. 1, describing in greater details a client component 10, a server component 20 and a management console component 30.

The client component 10 consists of software that is installed on a client computer 40. Said client computer may be operated by various operating systems such as but not limited to various operating systems developed by Microsoft Inc. from Washington, U.S.A. Said operating systems may include Microsoft Windows 98, NT, 2000 or XP operating system. The client component 10 interfaces with client side PKI aware applications 50 by providing standard client security APIs 60. The client component 10 communicates with the Microsoft Active Directory 70 over the organization network 80 to download configuration data. The client component 10 interfaces with the server component 20 to participate in secured data processing.

Those of skill in the art will appreciate that a client component may include various hardware components such as lap top computers, desk top computers, PDA's, work stations and the like and may include various software components such as operating systems that are not developed by Microsoft, such as Linux, Unix and the like.

Accordingly, other mentioned above and below software components, interfaces, communication protocols and encryption and decryption algorithms, may be replaced by other analogues software and interface components. For example, the Microsoft Active Directory may be replaced by other commercially available directories, thus allowing support for organizations with a more heterogeneous computing environment.

The server component 20 interfaces with the Directory 70 to retrieve client related information (such as user's details) and to receive user creation, deletion and update events.

If more than one server components (such as 20a, 20b, 20c) is able to assist in the secured data processing, they may all interface each other to support high-availability. The server component 20 interfaces the client component 10 to process client requests, including requests to participate in secured data processing, and is further connected to the management console component 30 to process administration requests.

The management console component 30 consists of software that runs on the administration computer 90 and is integrated with Microsoft Management Console (MMC) 100. The management console component 30 interfaces with the MMC user to receive administration commands as well as with the server component 20 to carry them out.

Referring to FIG. 2, the client component 10 is composed of a software module that may be able to interface via various API, such as but not limited to Microsoft CSP (Cryptographic Service Provider) API 61 and PKCS#11 API 62. The client component 10 is registered with the Windows CAPI (Cryptographic API) subsystem 63 so it can be accessed using the CAPI API 64 by PKI aware application 51. The client component 10 may be also directly registered with any PKI aware application 52 that uses the PKCS#11 API 62.

The API exposed by the client component 10 can be extended to include standard smartcard access APIs such as PC/SC. This requires an appropriate extension of the Client-Server API. This alternative allows more client applications to seamlessly integrate with the system and turns the system into a true centrally managed smartcard.

The client component 10 reads configuration data from local storage such as the Windows System Registry (WSR). The configuration information contains the network name or address of a server component 20. A list of server component (such as 20a, 20b, 20c) addresses may be used and in this case the client component 10 may select which server component to access, thus facilitating a client-based load-balancing scheme. If the WSR does not contain a server component 20 address, the address or list of addresses may be are retrieved from the Directory 70. Said retrieval may utilize the SCP (Service Control Point) mechanism.

Once a server component address is retrieved/selected the client component 10 tries to access said server components. If the connection attempt fails and other server components are accessible, the client component will try to access other server components.

The communication between the client component 10 and the server component 20 uses a reliable stream transport mechanism such as a TCP socket connection. After establishing the connection in the manner described above, the client component 10 creates an authenticated and encrypted logical session with the server component 20. This is performed using a standard security protocol such as TLS. The client component 10 authenticates the server component 20 in this process and verifies the server component's 20 certificate using a list of approved CA certificates. This process results in the creation of a set of symmetric Session Keys that may be used for encrypting outgoing data stream (from client component to server component and vice verse), decryption incoming data stream (received by the server component or the client component accordingly), authenticating the outgoing data stream and checking the authenticity of the incoming data stream.

The TLS protocol used to protect the communication between the client component 10 and server component 20 can be replaced with another security protocol with similar features. This includes the SSL protocol, the SSPI data protection services, and other well-known protocols.

Following the establishment of the secure session, the client component 10 will perform user authentication using the current user credentials that are available through the local operating system using for example the Windows SSPI API. SSPI is available as part of the Windows operating system from Microsoft Corporation. The authentication data is exchanged with the server component 20 for verification using the secure session. This process provides for a single-logon user experience.

Instead of using the SSPI mechanism for user authentication and single-logon, the server component 20 can store authentication information for each user in the database (such as a user password hash), and then the user will be prompted for the password after establishment of the TLS session. In this case the management console 30 will include the features needed to administer the user database including: user creation, user deletion, user password reset, defining password policy. The server component 20 will enforce the password policy, which includes minimal password length, password expiration, unsuccessful login attempt limit, etc. Such an implementation reduces the dependency on the organization's Directory 70 and allows implementing a non-Windows client component 10 and server component 20.

Following successful authentication, the client component 10 accepts application requests and transfers them for execution on the server component 20 using the following secure RPC mechanism: a) encode the request input parameters into a buffer, b) encrypt and authenticate the buffer using the Session Keys, c) transmit the buffer to the server component 20, d) receive an encrypted reply buffer, e) decrypt and check the authenticity of the reply buffer using the Session Keys, f) decode the reply buffer into the caller's output parameters and g) return to the calling application.

The implementation performs some of the functionality required by the CSP API 61 and the PKCS#11 API 62 locally on the client computer 40 and passes on to the server component 20 only the calls that require access to token objects. These calls comprise the Client-Server API. All operations are performed on the server component 20 under the identity of the authenticated end-user. This means that stored data on the server component 20 is always associated with a single specific user and can only be accessed by that user using the Client-Server API after successful authentication.

The functions of the Client-Server API are: (i) Store data—used to store data in the server component 20. The data may be any object defined in the PKCS#11 specification including all its attributes. This is mainly used by applications to store public keys and certificates. (ii) Retrieve data—used to read data from the server component 20. (iii) Delete data—used to delete a data object (iv) Enumerate data objects—used to list all objects available for retrieval. (v) Generate key—used to securely generate a private key (as defined by the RSA algorithm for example) in the server component 20 using the server component's 20 internal random source. Only the associated public key is returned to the client component 10. (vi) Decrypt or Sign—used to decrypt encrypted data using the RSA algorithm for example or to digitally sign data using a stored private key. (vii) Get random—returns random data from the server component 20. (viii) Login—provides the functionality needed for authenticating the client component 10 to the server component 20. Must be used before all other functions The Client-Server API can be extended to provide the full CSP API 61 and/or the full PKCS#11 API 62. In this case the server component 20 can centrally audit and archive all the original data being signed by the user for better control on the use of signing keys. This alternative also improves security on the client computers 40 by removing not only the long-term private keys but also the short-term symmetric encryption keys from the client computer's 40 memory.

The server component 20 is composed of a computing device running the server application software. The implementation includes a dedicated platform for increased security. The dedicated platform includes for example a hardened operating system (reduced to include only those features needed to support the server application software), and the following examples for specialized hardware components: tamper evident enclosure (such as the enclosure used by Algorithmic Research's of Petach Tikva, Israel, PrivateServer) and a keyboard connected intelligent smartcard reader (for example: Algorithmic Research's CryptoSafe). The smartcard reader is used to: a) filter user keyboard activity to prevent unauthorized keystrokes from reaching the machine's internal keyboard port, b) to provide random number seed for the software based psuedorandom number generator and c) to provide access to the smartcard which is used during machine startup to derive the database protection keys. The dedicated platform conforms to the requirements of NIST's FIPS 140-2 level 3. For example, secured information, such as private keys or even a secondary key used to encrypt the private keys may be immediately erased once the system detects any tampering. The detection can be based upon sensors that may indicate a lid of the highly secured entity or one of its panels is lifted and/or shifted or removed.

The server component 20 includes a relational database (such as Microsoft's SQL Server product) to store the client components' 10 token objects and additional configuration and context information.

Sensitive information in the database (keys) are stored in an encrypted form. Said encryption may be implemented by symmetric encryption algorithms and integrityprotected using a MAC algorithm such as but not limited to: encryption using triple-DES CBC with random IV and data integrity using triple-DES CBC MAC. The cryptographic keys to be used in this database data protection scheme will be derived using the smartcard and reader from a master key into the server component's 20 memory during the server component's 20 startup.

Instead of using a master secret key to derive the database protection keys, the database protection keys can be derived from the user authentication data. This way it is guaranteed that only the authenticated user can access his token objects and keys.

In order to improve performance in PKI intensive environments, a cryptographic accelerator hardware module can be added to the server component 20. This will allow serving more signature and/or decryption transactions per second.

The server component 20 may be further enhanced with a hardware module that will store the private key values instead of the corresponding database table. This hardware module can be composed of multiple smartcard chips and thus can provide the state-of the-art protection for this sensitive information. In effect this alternative turns the server component 20 into a network attached smartcard repository. In this alternative the private keys will be generated inside a smartcard chip and all the signatures or decryption operations will be computed by the smartcard that holds the key. In order to support high-availability, a chip-to-chip authentication and synchronization protocol is implemented in the smartcard chip's operating system. This protocol allows backup copies of private keys to be made to another chip without exposing the private keys externally.

For security reasons, the private keys will not be stored in the server component's 20 non-volatile memory in clear-text form. When a database backup is performed, the whole backup copy is encrypted again before transmission to the requesting management console component 30. This encryption uses another independent set of encryption keys.

The server component's database includes: (i) User table—containing for each user a unique identifier (which is used as a database index) and the associated unique user identifier used by the Directory 70 (such as the user's Windows GUID). (ii) User token data objects table—containing for each user a list of objects created by the server component 20 or client component 10. Each object includes a set of attributes as defined by the PKCS#11 specification. The object types include public keys, certificate and private keys objects. For private key objects, the actual key value is stored in a separate table. (iii) User private keys—containing for each user a list of private key values each associated with a specific private key data object in the user data objects table. The key values are encrypted as described above. (iv) Server configuration data—containing a set of data required by the server component 20 for operation.

The server component 20 includes a built-in Certificate Authority (such as the Microsoft Certificate Server) that is used by the server application software to issue certificates and CRLs in response to user creation, update and deletion events received from the Directory 70. The CA will also be used by the server application software to periodically renew user certificates which are about to expire.

The server component 20 may be configured to interface an existing organizational CA for requesting, retrieving and revoking user certificates instead of the built-in CA. This supports environments where a CA is already installed and allows better flexibility (albeit with more administrative overhead) for the security administrator.

The server component 20 listens for incoming connection requests from client components 10. When such a connection is established, the server component 20 proceeds to establish a TLS session as described above. The server component 20 is designed to handle a large number of such sessions in parallel to simultaneously support many client computers (such as 40a, 40b, 40c). This is achieved using standard known in the art practices for server design (running multiple threads, using pipes as an IPC mechanism, etc.)

After establishing a secure session, the server component 20 will verify the user authentication data by using for example the operating system's SSPI authentication mechanism to authenticate the client user credentials.

Each client component 10 request is processed according to the specification of the Client-Server API. Where access to the user's token objects is needed, the database described above is used. The requests may retrieve, delete or modify the user token object database. In the case of private key operations, the key itself will not be available for retrieval outside the server component 20. Only the key-store, key-generate, decrypt-using-key and sign-using-key operations will be allowed on the private key.

The server component 20 receives notifications from directory 70. These notifications may be based on periodic polling. The notifications consist of user creation, update and deletion events. The notifications are implemented for example using Microsoft's uSNChanged querying for Active Directory.

Referring to the flowchart in FIG. 3, describing an enrollment session. The session includes the following steps: receiving a user creation event (step 110); creating for said new user an entry in the database by the server component 20 (step 111), generating a RSA key-pair for the user (step 112), storing the private and public key objects in the database (step 113) and preparing (step 114) and submitting (step 115) a certificate request on behalf of the user for the newly generated key. The certificate request is submitted to the built-in CA. Certificate requests are created using the new user details as retrieved from the Directory 70, and may follow the PKCS#10 certificate request format standard. This includes a digital signature on the request using the user private key for which the certificate is being requested. The preparation of the PKCS# 10 request may require usage of a user certificate template which defines the various attributes and extensions a user certificate should include. This template, if required by the CA will be stored in the database as part of the server component's 20 configuration data and will be accessible for modification by an authorized administrator.

The request may further be digitally signed using the PKCS#7 standard using a private key owned by the server component 20 itself and generated and stored in the database during the server component 20 installation. This enrollment-agent signature may be required by the CA in order to issue certificates requested by the server component 20 on behalf of other users. The server component 20 will retrieve the issued certificate from the CA (step 116) and store it in the database (step 117).

When a user update event is received from a directory 70, and if the change affects any details contained in the user's previously issued certificate, the server component 20 will request a new certificate containing the updated information from the CA. The server component 20 will then retrieve the issued certificate and store it in the database. The previous certificate will then be revoked (by sending a revocation request to the CA) and deleted from the database.

When a user deletion event is received from a directory 70, the server component 20 will request a revocation of the previously issued user certificate from the CA. In this case the CA will issue a new CRL that includes a reference to the revoked certificate. The CRL will be available to external PKI aware client applications through existing means. The user related database entries (objects and private keys) will not be automatically deleted in this case to allow key recovery (use of revoked key) by an authorized administrator.

The management console 30 interface may resemble the client component 10 interface but after a successful SSPI authentication a check is performed in the Directory 70 to verify that the authenticated user is indeed a domain administrator. This is done to make sure only properly authorized users are allowed to access the management functions.

The system further may include an audit log that contains a listing of events that occur in the server component 20. Each event log entry contains the server component 20 ID, time and date, user ID, event description and event parameters. The user ID refers to events logged during processing of a client component 10 or management console 30 request, and represent the unique identification of the authenticated user. The event description and parameters provide sufficient information for administrators without exposing any secret information (such as key values).

The management console 30 may be implemented as a snap-in to the MMC. The snap-in provides the user interface elements needed to operate the various management functions. The console component 30 uses the same mechanisms as the client component 10 in relation to the communication with the server component 20 (TCP socket, TLS, RPC, SSPI). The set of functions provided is: Server component 20 Shutdown; Server component 20 database backup and restore; Server component 20 audit log management; Server component 20 configuration; and Download digitally signed software updates to the server component 20.

It will thus be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

List of Acronyms

API—Application Program Interface.
CA—Certificate Authority.
CAPI—Cryptographic API.
CBC—Cipher Block Chaining.
CRL—Certificate Revocation List.
CSP—Cryptographic Service Provider.
DES—Data Encryption Standard (NIST FIPS 46-3).
DH—Public key infrastructure algorithm introduced by Diffie, Hellman and Merkle.
DSA—Digital Signature Algorithm (NIST FIPS 186-2).
FIPS—Federal Information Processing Standard.
GUID—Globally Unique Identifier.
IPC—Inter Process Communication.
MAC—Message Authentication Code.
MMC—Microsoft Management Console.
NIST—National Institute for Standards and Technology.
OTP—One Time Password.
PC/SC—Personal Computer/Smart Card.
PKCS—Public Key Cryptography Standard.
PKCS#7—Public Key Cryptographic Standard #7.
PKCS#10—Public Key Cryptographic Standard #10.
PKCS#11—Public Key Cryptographic Standard #11.

PKI—Public Key Infrastructure.
RPC—Remote Procedure Call.
RSA—Public key infrastructure algorithm introduced by Rivest, Shamir and Adleman.
SCP—Service Connection Point.
SSL—Secure Sockets Layer.
SSPI—Security Support Provider Interface.
TCP/IP—Transmission Control Protocol/Internet Protocol.
TLS—Transport Layer Security (IETF RFC 2246).

We claim:

1. A method for facilitating secured data processing, the method comprising the steps of:
- receiving, from the client, a request to add a digital signature to a document to send to another client;
- enrolling the client with a secured entity;
- wherein the secured entity comprises a tamper evident enclosure, wherein the tamper evident enclosure encapsulates all hardware components of the secure entity and a keyboard connected intelligent smartcard reader;
- wherein the secured entity is coupled to multiple client components;
- determining a need to generate a private and public key for a client, in response to the enrollment of the client; wherein the step of determining comprises accessing an entity other than the secured entity;
- generating, for each client out of at least two clients, a private key and a public key thereby providing private keys and public keys;
- storing at least the private keys at the secured entity;
- whereas the secured entity is operable to utilize at least one of the private keys to perform public key infrastructure (PKI) processing without retrieving the private key from the secured entity by any entity outside the enclosure;
- generating a digital signature;
- processing, in response to at least one of the private keys, data that is sent from the client of the at least two clients to another client of the at least two clients;
  - generating, by the client, a first document fingerprint (DFP) of a document to the highly secured entity;
  - transmitting, by the client, the first DFP and the document to the secured entity;
  - receiving, by the secured entity, the first DFP and generating a second DFP by applying a PKI algorithm on the first DFP;
- receiving by the secured entity, from the client, a first document fingerprint (DFP) of a document and the document;
- generating, by the secured entity, a second DFP by applying a PKI algorithm on the first DFP;
- transmitting, by the secured entity, the digital signature, the document and the second DFP the another client;
- generating, by the another client, a third DFP by processing the document and applying the PKI on the second DFP with the public key of the client, to provide a fourth DFP;
- comparing the third DFP and the fourth DFP and determine if they are equal;
- when the third DFP and the fourth DFP are equal, then it is verified that the received digital signature was the digital signature of client;
- requesting, by the another client, to encrypt another document with a key and to send the encrypted document to the client;
- wherein the another client applies the PKI algorithm on the key with the client's public key;
- sending, by the another client, the encrypted document and the encrypted key;
- receiving, by the client, the encrypted document and the encrypted key;
- establishing, by the client, a secured session with the secured entity;
- sending by the client, the encrypted key to the secured entity;
- receiving, by the secured entity, the encrypted key and applying a PKI algorithm on the encrypted key, using the client's private key and transmitting the public key to the client;
- receiving, by the client, the public key and decrypting the encrypted document.

2. The method of claim 1 further comprising storing client attribute certificates at the secured entity.

3. The method of claim 1 further comprising the steps of requesting the certificate for the client and receiving the certificate for the client.

4. The method of claim 3 whereas the step of requesting comprises establishing the secure session with the certificate authority.

5. The method of claim 3 further comprising storing the received certificate in the secured entity.

6. The method of claim 3 wherein the secured entity comprises the certificate authority.

7. The method of claim 1 further comprising the step of deleting the private key of the client in response to information provided by a client management entity.

8. The method of claim 1 further comprising creating the audit log in the highly secure entity of all private key usages.

9. The method of claim 1 further comprising creating an archive of all signed documents.

10. The method of claim 1 further comprising producing a backup encrypted database.

11. The method of claim 1 further comprising updating the secured entity by digitally signed software.

12. The method of claim 1, wherein the secured entity comprises at least one network server.

13. The method of claim 1, wherein the secured entity comprises a hardened operating system that is reduced to substantially comprise only features needed to support a server application software.

* * * * *